United States Patent
Ichimura et al.

(12)
(76)

(10) Patent No.: US 6,450,115 B1
(45) Date of Patent: Sep. 17, 2002

(54) BICYCLE BELL WITH INVERTED DOME

(76) Inventors: Kyoji Ichimura, 4-8, Nishi-Ogu
4-Chome, Arakawa-Ku, Tokyo (JP);
Motohisa Ishiwa, 4-8, Nishi-Ogu
4-Chome, Arakawa-Ku, Tokyo (JP);
Kazaharu Seki, 2-14-2, Kamata,
Setagaya-ku, Tokyo (JP)

( * ) Notice: Subject to any disclaimer, the term of this patent is extended or adjusted under 35 U.S.C. 154(b) by 33 days.

(21) Appl. No.: 09/632,643

(22) Filed: Aug. 4, 2000

(51) Int. Cl.[7] ............................................. G10K 1/072
(52) U.S. Cl. ..................... 116/152; 116/154; 116/166
(58) Field of Search ............................... 116/148, 149, 116/150, 152, 154, 155, 156, 157, 158, 159, 160, 161, 163, 164, 166, 167, 170, 171, 172; 84/406

(56) References Cited

U.S. PATENT DOCUMENTS

| 607,936 | A | * | 7/1898 | Lester ......................... 116/154 |
| 641,827 | A | * | 1/1900 | Brink ......................... 116/163 |
| 2,554,046 | A | * | 5/1951 | Moard ......................... 116/154 |

FOREIGN PATENT DOCUMENTS

| FR | 729864 | * | 5/1932 | .................. 116/166 |
| GB | 696264 | * | 8/1953 | .................. 116/166 |
| IT | 345020 | * | 12/1936 | .................. 116/166 |
| IT | 361344 | * | 7/1938 | .................. 116/166 |

* cited by examiner

*Primary Examiner*—Christopher W. Fulton
(74) *Attorney, Agent, or Firm*—Thomas W. Hanson (57) ABSTRACT

A bicycle bell with an inverted bell dome and a substantially enclosing cover. Preferably, the cover also functions to activate the bell. Alternatively, a lever actuator can be used, either in combination with the cap or as a separate element. The cover shields the bell dome from rain or other water and helps prevent the accumulation of water drops on the surface of the bell dome. The bell is adaptable to a variety of striking mechanisms but preferably uses one incorporating a gear train with a gear ration of at least 1:10 providing very rapid, long duration striking for relatively small movement by the user. The cap can be made of a transparent or semi-transparent material allowing the operation of the striking mechanism to be viewed.

7 Claims, 9 Drawing Sheets

BICYCLE BELL WITH INVERTED DOME

FIELD OF THE INVENTION

This invention relates to the field of warning bells and specifically to bells for attachment to the handlebars of bicycles or the like.

BACKGROUND OF THE INVENTION

Bicycle bells in various forms have been well known for decades. While available in a wide variety of configurations and combinations, a common design element pervades all of them: the bell opens downward, toward the handlebars. There is good reason for this.

The traditional method of hanging a bell of any type is to suspend it from a single connection at the top with the mouth downward. This places the center of mass of the bell below the mounting point and allows the bell to hang freely from a relatively loose coupling. This also allows the clapper to hang freely within the bell.

Bicycle bells have followed the tradition established by normal bells. Like the bells on a shopkeeper's counter, the dome of the bell is suspended from a single point at the tip of the bell with the mouth downward, although a bicycle bell may be more firmly attached. This position makes the bell dome readily accessible to external strikers. If preferred, this arrangement also allows the striking mechanism to be hidden within the dome. In this configuration, the dome provides a smooth, aesthetically pleasing exterior with a minimum number of pieces to be manufacture.

The major drawback to the traditional arrangement is that the bell dome is exposed to the weather. Specifically, it is exposed to rain and other moisture. Water drops which accumulate on the bell dome dampen the vibration of the bell, quieting the bell and shortening the duration of the chime. This effect is increasingly noticeable with small bells of the size of a typical bicycle bell. The size and mass of the drops which can accumulate on the bell are large relative to the size of the bell itself. Similar problems occur where tree sap, oil, or dirt accumulate on the bell dome. A bell configuration which protects both the striking mechanism and the bell dome would be preferred.

The striking mechanisms typically found on bicycle bells also typically provide a relatively low number of strikes for a relatively large movement of the users finger or thumb. A longer duration sound may require a large movement, possibly requiring removing the user's hand from the handlebar, jeopardizing control of the bicycle. It would be preferable if relatively small movements by the user would be reflected in a longer duration sound or a higher number of individual strikes.

There is a need for a bicycle bell in which the dome of the bell is substantially sheltered from rain and other environmental factors so as to avoid accumulation of water drops or other material. That portion of the dome which is exposed should be designed to shed water. The basic design should be readily adaptable to a variety of striking mechanisms but would preferably use one which provides a high ratio of strikes to user activation.

SUMMARY OF THE INVENTION

The present invention is directed to an apparatus which is usable as a warning bell for a bicycle, tricycle, or similar. The apparatus turns tradition on its head by inverting the bell dome to face upward. A cover, or cap, then spans the opening and preferably extends downward enclosing most of the sides of the dome. The striking mechanism is placed within the dome, enclosed by the cover.

According to the invention there is provided a gear train connecting the cap to the striking mechanism so that rotating the cap activates the strikers.

According to an aspect of the invention this gear train provides a gear ratio of over 10:1 providing very rapid strikes with very little movement of the cap.

According to another aspect of the invention a lever may be attached to the cap and a sector gear used to energize the gear train.

Further in accordance with the invention the lever may be separate from the cap with the cap and the lever cooperating to enclose the bell dome.

The advantages of such an apparatus are a bell dome which is almost entirely shielded from rain while still enclosing the operating mechanism. The design is aesthetically pleasing and easily activated. The exposed lower portion of the bell slants or curves inward to the mounting point in a shape which readily sheds water drops. Where the cover is made of a transparent or semi-transparent material, the action of the striking mechanism can be readily viewed.

The above and other features and advantages of the present invention will become more clear from the detailed description of a specific illustrative embodiment thereof, presented below in conjunction with the accompanying drawings.

DETAILED DESCRIPTION OF THE INVENTION

The following discussion focuses on the preferred embodiment of the invention, in which a bicycle bell using an inverted dome is configured for attachment to the handlebars of a bicycle, tricycle, or similar. However, as will be recognized by those skilled in the art, the disclosed apparatus is applicable to a wide variety of situations in which it is desirable to shelter the dome from water or other environmental hazards.

Glossary

The following is a brief glossary of terms used herein. The supplied definitions are applicable throughout this specification and the claims unless the term is clearly used in another manner.

Dome—generally that cup-shaped portion of the bell which resonates, or rings, when struck. This is the true "bell"

of the device, but will be referred to herein as a dome to avoid confusion as the complete device is typically also called a bell.

Mouth—the wide opening of the dome intended to project the sound of the bell.

Striker—any device which is used to strike the bell, causing it to ring.

Striking mechanism—the combination of one or more strikers with their activation mechanism. These may include a single striker on a spring, multiple strikers driven by a gear train, and others.

Preferred Embodiment

The disclosed invention is described below with reference to the accompanying figures in which like reference numbers designate like parts.

Structure

The components of the preferred embodiment can be seen by reference to FIGS. 1–4. Attaching bracket, 106, is a conventional design constructed of plastic or other somewhat flexible material. In use, it encircles a bicycle handlebar, or other tube, and is clamped around the tube by tightening screw, 118. The screw may either thread into the body of the bracket itself, or mate with a nut embedded within, or inserted into, the bracket. Protrusion, 120, provides a mount for the bell dome, 104. Clearly other forms of bracket could be used without impacting the invention.

The bell dome, 104, is arranged with its mouth facing upward, inverted from the typical arrangement. A hole in the center of the dome fits over protrusion, 120, to mount the dome. During assembly pin, 108, is forced into a hole in the center of the protrusion spreading the protrusion outward, firmly securing the dome in place. Preferably, the hole through the dome incorporates inwardly extending ears which engage a slot in the protrusion to resist rotational movement by the dome. The preferred configuration of the dome utilizes substantially straight sides to provide a close fit with the cap, 102, and a downwardly curved or angled lower portion. The lower portion of the dome is the only part exposed to rain and the curve or angle helps the dome shed raindrops rather than accumulating them.

Cap, 102, serves the dual purposes of covering the dome, 104, of the bell and actuating the striking mechanism, 114. The cap is mounted to the bracket, 106, by pin, 108. In the preferred embodiment, main gear, 110, is pressed on to the pin and retains the cap against the head of the pin. While the main gear is rotationally fixed relative to the pin, the cap is free to rotate about the axis formed by the pin. As described below, rotational movement of the cap causes movement of the pinion gears, 112A & B, which mesh with each other and the main gear and, in turn, drive the striking mechanism. The alternating groove and ridges around the outer circumference of the cap provide a high traction surface easily engaged by the user's finger or thumb to rotate the cap. The upper surface of the cap extends radially outward from the pin to just beyond the outer circumference of the bell dome. The cap then extends downward, forming a skirt which encloses the sides of the dome. In this manner, the cap encloses and protects the upper portion of the dome without coming into contact with it. This almost entirely protects the dome from being contacted by rain drops, or other water spray, which would dampen the resonance of the bell. Preferably, the cap is formed by injection molding plastic, providing a continuous waterproof surface. A relatively tight fit between the cap and the head of the pin resists entry of all but the slightest amount of water around through the opening for the pin. Ideally, the cap is formed from transparent or semi-transparent plastic, allowing the workings of the striking mechanism to be viewed as the bell is operated. Selecting an appealing color for the cap and brightly colored, contrasting colors for the parts of the striking mechanism makes the bell visually attractive to users.

Mounting pin, 108, extends downward though the central axis of the cap, 102, main gear, 110, and striking mechanism, 114, and into the bracket, 106, mounting these parts to the bracket. The pin also serves as an axle about which the cap and striking mechanism rotate. Main gear, 110, is fixed to the pin. Optionally, a low friction washer (not shown) can be positioned between the head of the pin and the cap to reduce friction and improve the water resistant seal of the joint.

The basic configuration of the bell is readily adapted to a variety of striking mechanisms, some well known, and some novel. These striking mechanisms may be activated by lever action, by the rotational movement of the cap, or possibly by other user activated motion. The bell configuration provides that the striking mechanism will be enclosed by the cavity formed when the dome is enclosed by the cap. This fully protects the striking mechanism from weather, the probing fingers of users, and other potentially damaging elements.

The preferred embodiment utilizes a gear train which provides a substantially higher rotational speed for the striking mechanism, 114, than for the cap, 102. In the illustrated form, a gear ratio of approximately 1:11 is achieved. Combined with three strikers being carried by the striking mechanism, this provides 9 distinct, rapid strikes for only slightly more than a 90 degree movement of the cap. This provides a clear, penetrating sound with only a small effort by the user. Clearly, a range of gear ratios can be achieved by adjusting the gear sizes.

Pinion gears, 112A & B, are mounted on shafts extending downward from the inner surface of the top of the cap, 102, causing them to move with the cap as it rotates. Each pinion is a stepped gear unit comprising a smaller diameter and a larger diameter gear portion. The smaller portion of pinion 112A engages fixed main gear, 110, causing the pinion to rotate about its axis as the cap is rotated. The larger portion of pinion 112A then engages the larger portion of pinion 112B, causing it to rotate at an increased rate. The larger portion of pinion 112B then engages the relatively small gear formed into the striking mechanism, 114, causing the striking mechanism to rotate at a higher rate than pinion 12B. The end effect of this gear train is that the striking mechanism rotates about the same axis as the cap, but at a rate 11 times faster. Optional retaining clips can be used on one or more of the pinion gear shafts to retain the gears.

The preferred form of the striking mechanism, 114, comprises a cage with outwardly extending arms and an integrally formed gear to engage the gear train for activation. Located at or near the end of each arm is a striker, 116, arranged to make contact with an inwardly projecting portion of the bell dome, 104. Each arm has an upper and lower portion arranged to capture the striker between them. Each portion has a small protrusion, or bump, aligned and extending toward the opposing arm. The strikers resemble flat washers with a central hole having a larger diameter than that of the protrusions. This arrangement allows limited inward and outward radial movement of the strikers. Centrifugal force from the rotation of the cage forces the strikers outward to a position where they will impact the inward projection on the bell dome. Impact with the projection causes the strikers to rebound inward, clearing the protrusion, until overcome by the centrifugal force. This arrangement provides sufficient force of the striker against the bell dome, combined with free inward movement to avoid unnecessary retarding of the rotational movement of the cage, without the requirement of a resilient element in the striking mechanism.

Alternative Embodiments

Figure 1:
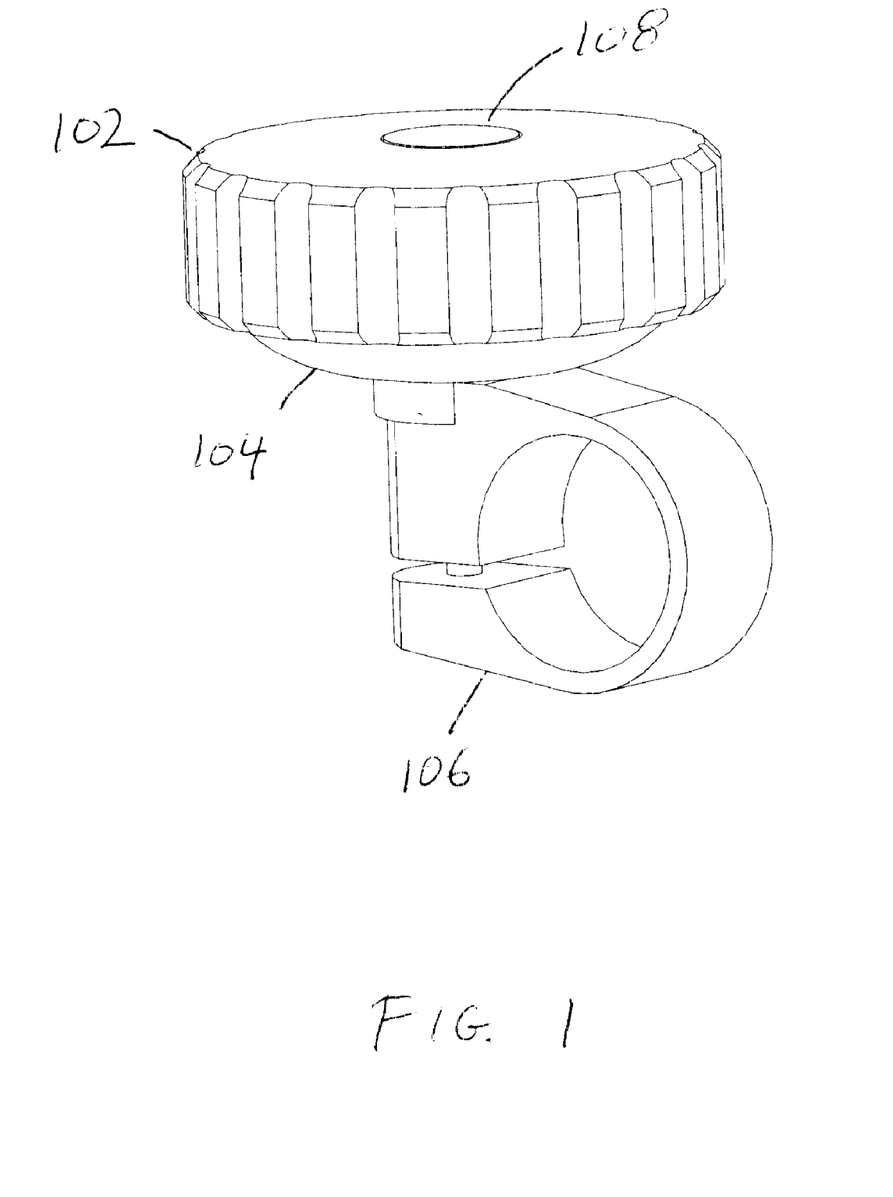
FIG. 1 provides an isometric view of the preferred embodiment of the invention.
Figure 2:
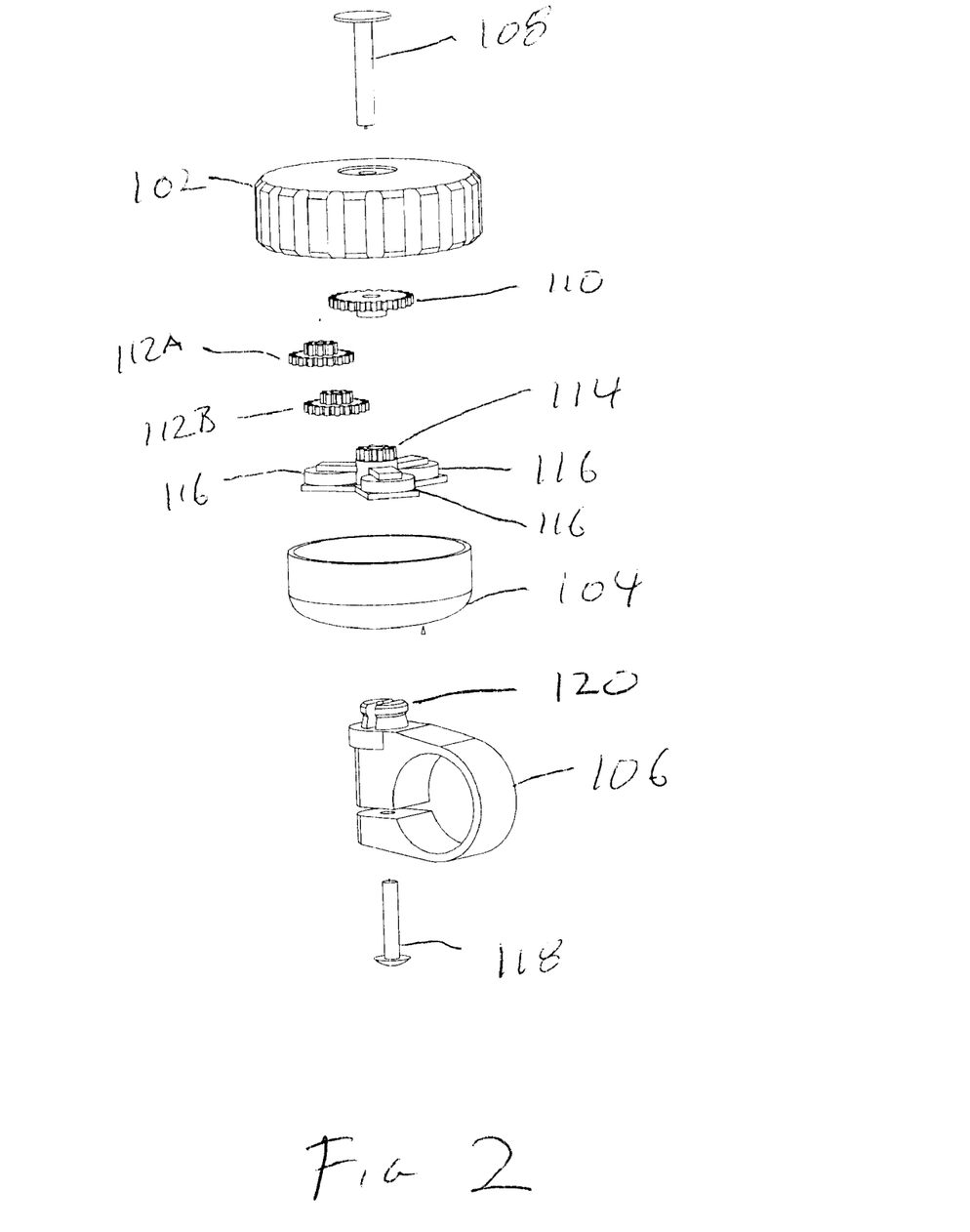
FIG. 2 provides an exploded view of the preferred embodiment.
Figure 3:
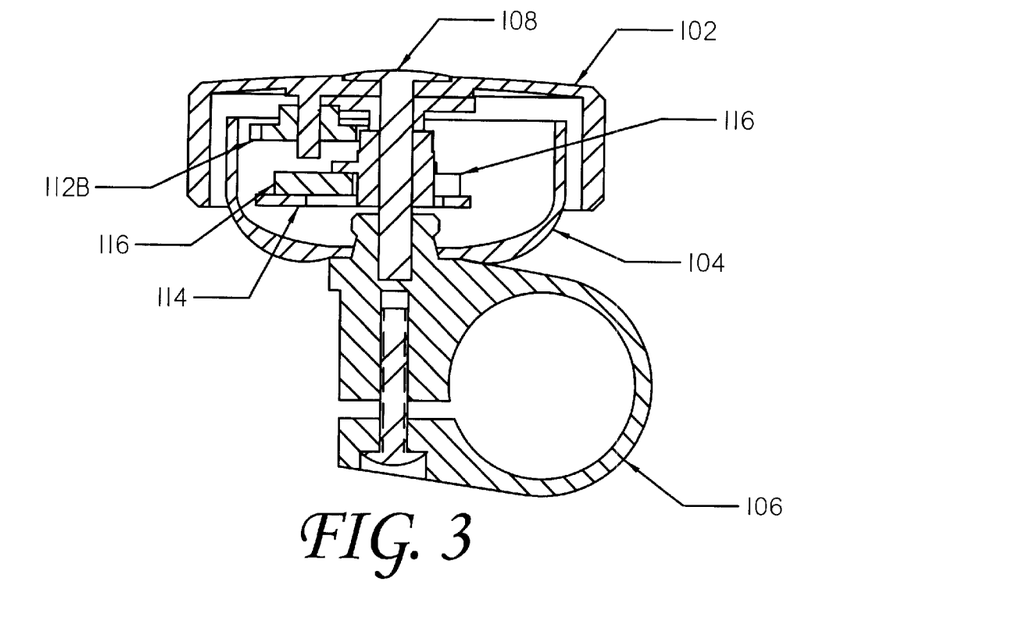
FIG. 3 is a side cross-section of the preferred embodiment.
Figure 4:
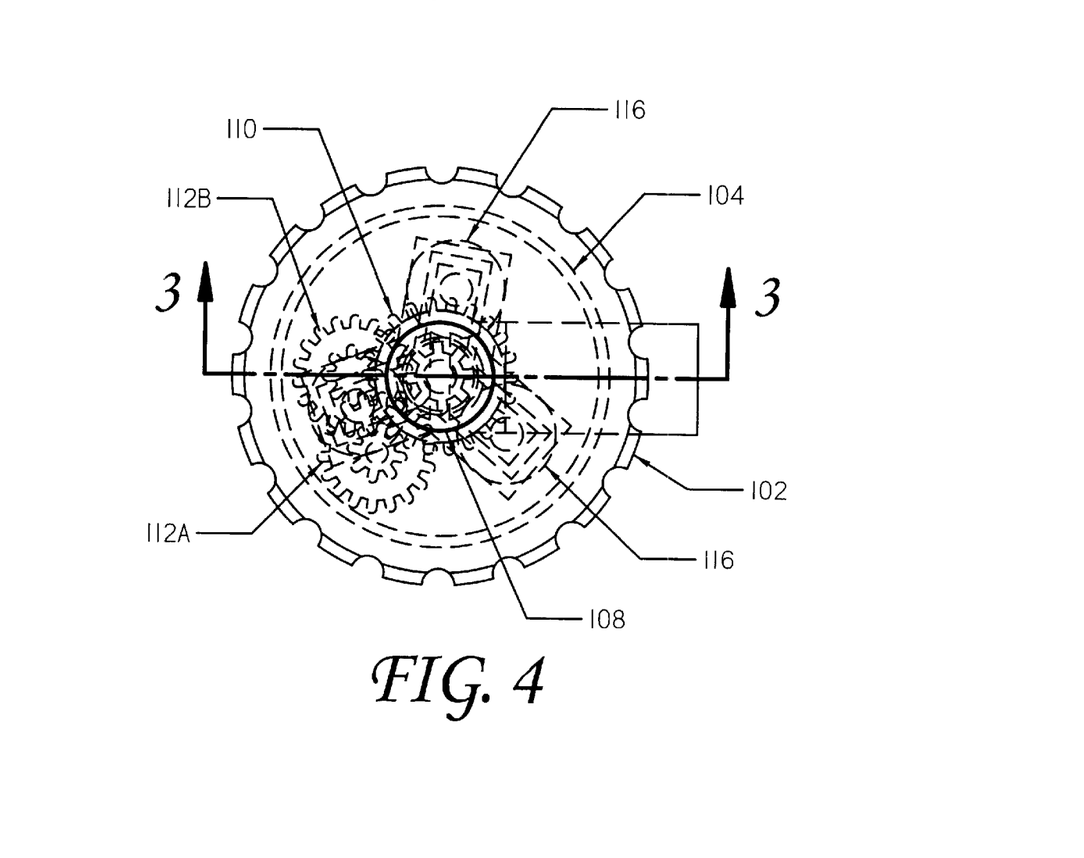
FIG. 4 is a top view of the preferred embodiment.
Figure 5:
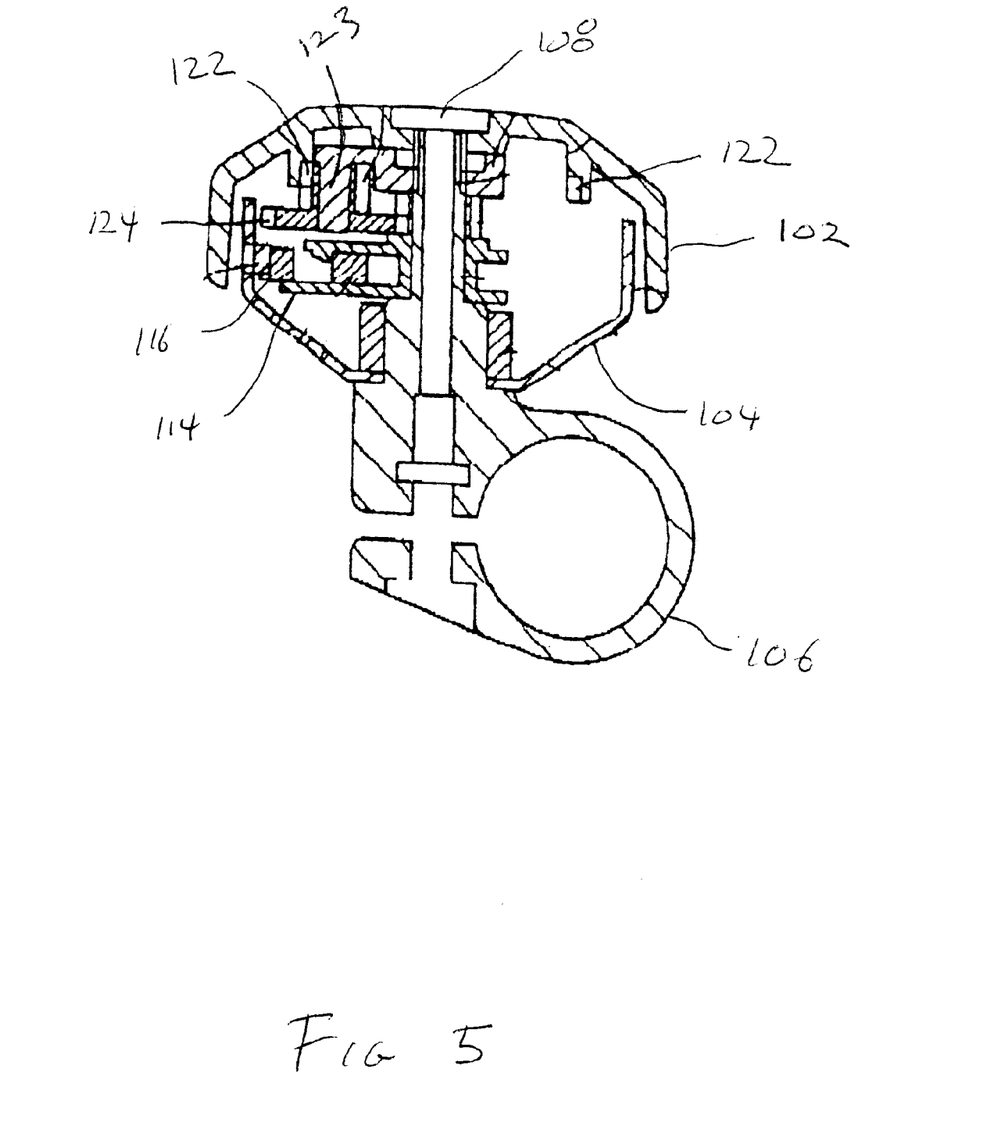
FIG. 5 is a side cross-section of a first alternative embodiment.

FIG. 5 illustrates a first alternative embodiment of the inventive bell. The basic structure is unchanged, including bracket, 106; dome, 104; striking mechanism, 114; and strikers, 116. The drive train has been modified by eliminating the main gear and, instead, forming a ring gear, 122, on the underside of the cap, 102. This ring gear engages pinion, 124, which is mounted to plate, 123, at an offset from but fixed relative to the center pin, 108, instead of to the cap. As shown, a single pinion is used which drives the striking mechanism. A gear train utilizing two pinions, as with the preferred embodiment, could also be used for an increased drive ratio. Also note the angled profile of the lower portion of the dome as an alternative to the curved section in the preferred embodiment.

Figure 6:
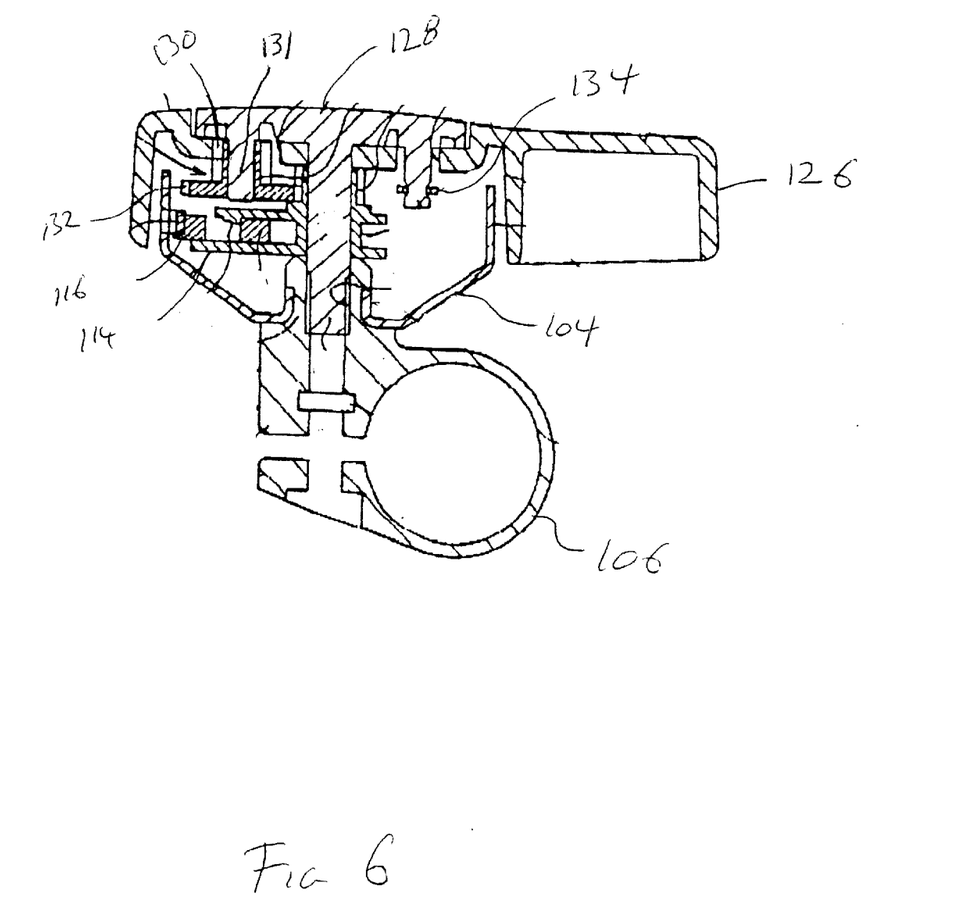
FIG. 6 is a side cross-section of a second alternative embodiment.
Figure 7:
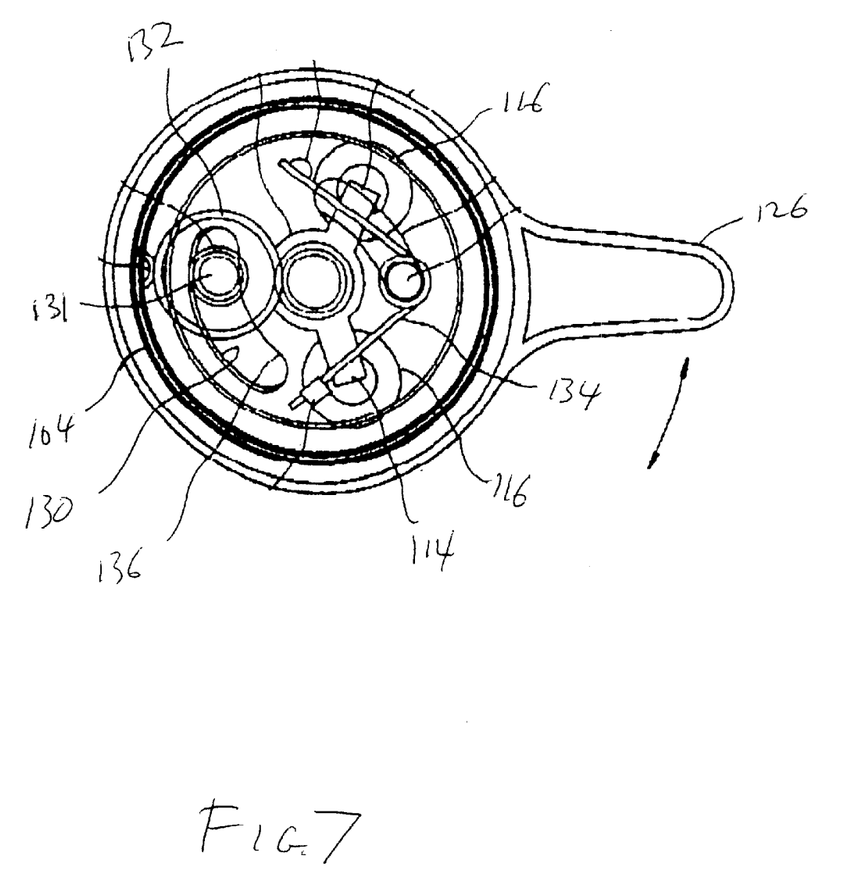
FIG. 7 is a top view of the second alternative embodiment.
Figure 8:
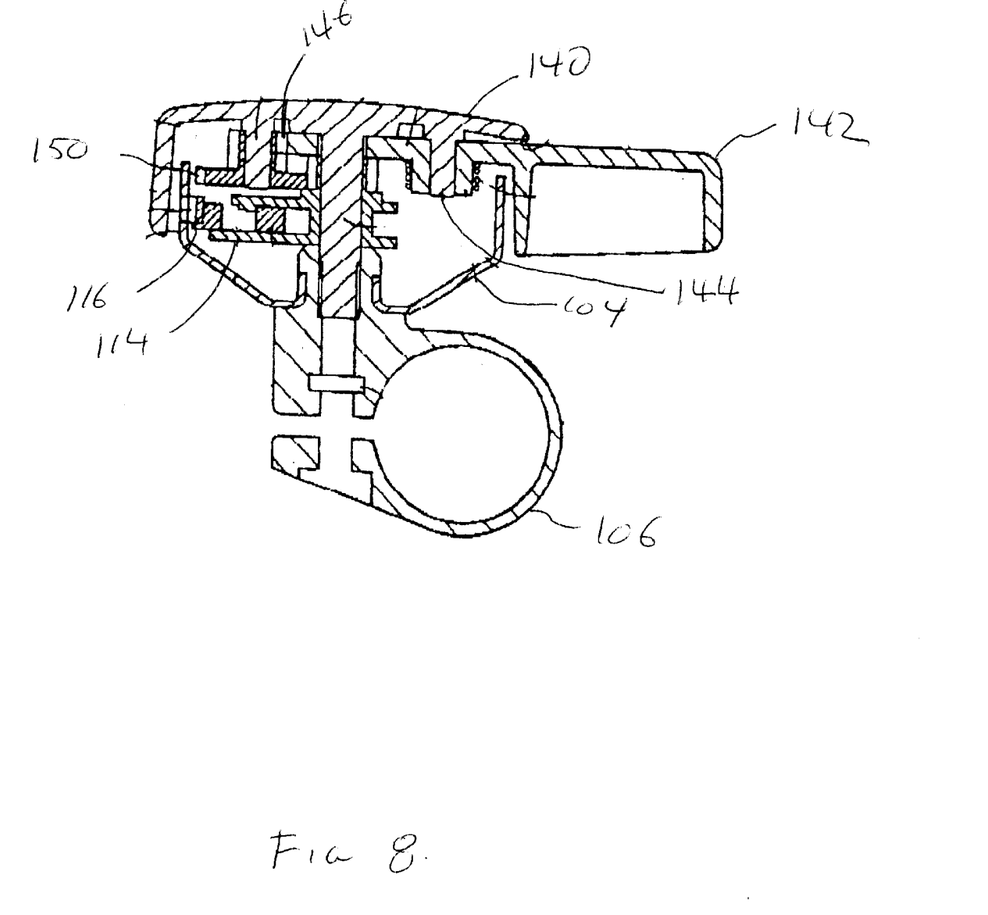
FIG. 8 is a side cross-section of a third alternative embodiment.
Figure 9:
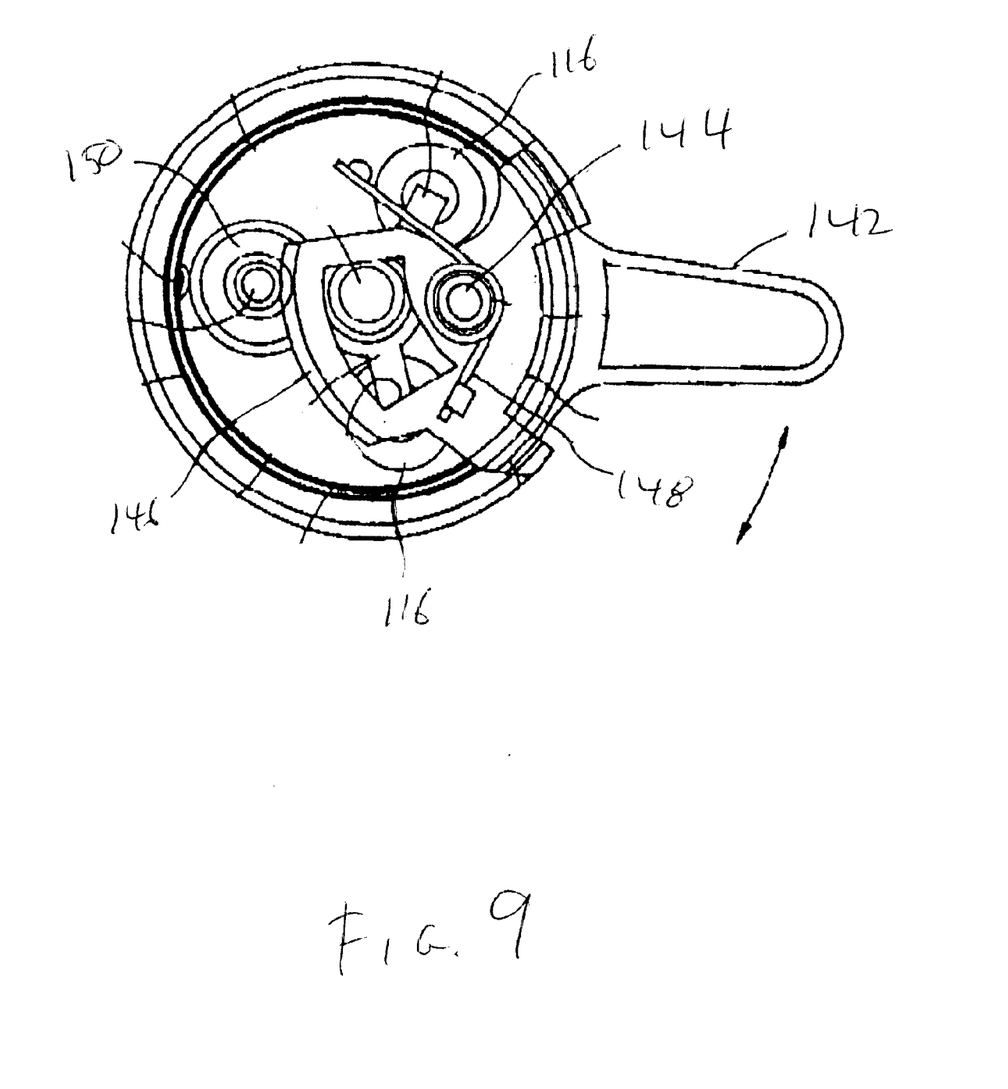
FIG. 9 is a top view of the third alternative embodiment.

FIGS. 6 & 7 illustrate a second alternative embodiment. Again, bracket, 106; dome, 104; striking mechanism, 114; and striker, 116, remain unchanged. Lever, 126, pivots on the central shaft of the combined cap and pin, 128, moving in a short arc. It is returned to neutral by spring, 134. Gear teeth, 130, are formed along the edge of opening, 136, which is concentric with the central shaft. These gear teeth engage pinion, 132, which is mounted to the enlarged pin, 131, thus remaining stationary. As above, the pinion engages the striking mechanism, but could also engage a second pinion for increased drive ratio. This mechanism provides an alternating action in which the striking mechanism rotates a number of revolutions in one direction as the lever is actuated, and then stops and reverses direction when the lever is released and urged back to neutral by the spring.

Figure 10:
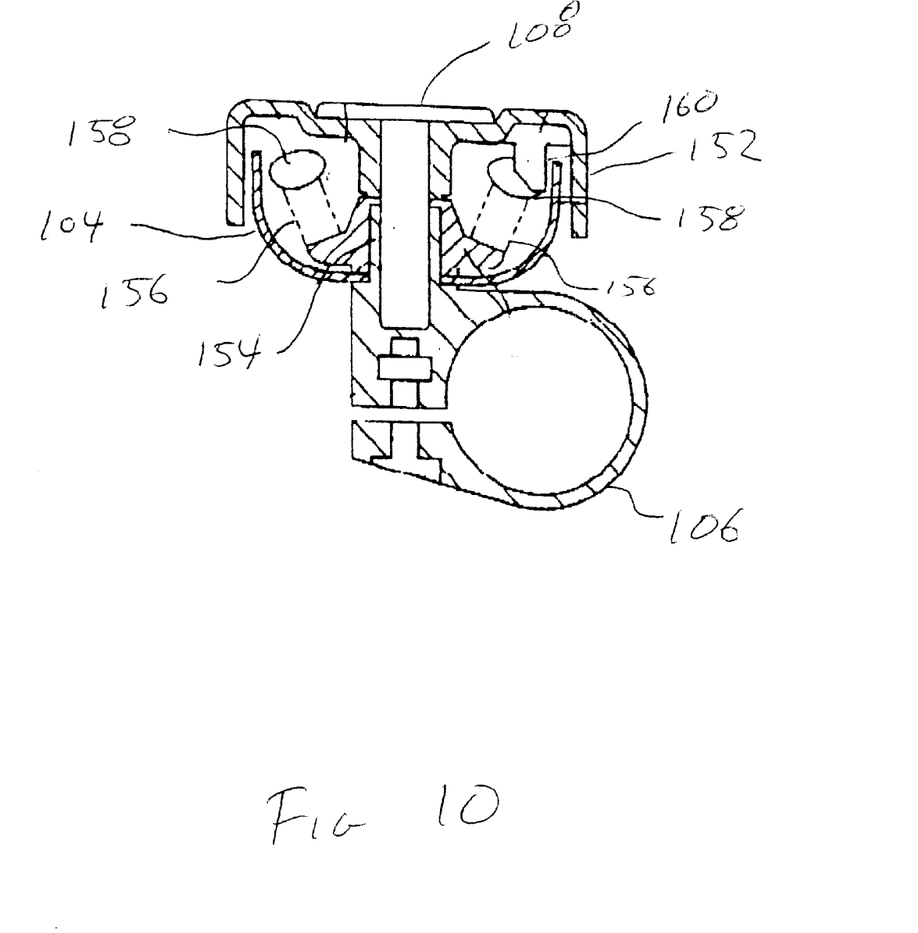
FIG. 10 is a side cross-section of a fourth embodiment.

FIG. 10 illustrates a fourth embodiment of the bell which uses a much simpler mechanism. Bracket, 106, dome, 104, and pin, 108, are as in the original. Cap, 152, mounts one or more projections, 160, which are arranged so as to displace weights, 158, as they pass by. The weights are mounted on springs, 156, or other resilient means, causing the weights to rebound after being displaced and striking the bell dome. No increased drive ratio is provided, but the effective number of strikes can be modified by altering the number of protrusions and weights. This embodiment offers the advantages of simplicity and ease of manufacture.

Note that all of the above alternative embodiments incorporate an inverted bell dome with an enclosing cover to protect the dome from rain. As they demonstrate, the basic design of the present invention can be readily adapted to a variety of striking mechanism and actuators. These could easily include electric or electronic strikers as well as the above mechanical means.

While the preferred form of the invention has been disclosed above, alternative methods of practicing the invention are readily apparent to the skilled practitioner. The above description of the preferred embodiment is intended to be illustrative only and not to limit the scope of the invention.

We claim:

1. A warning bell for attachment to bicycle handlebars, comprising:
  a) a bracket adapted to mount to the handlebars;
  b) a bell dome mounted on said bracket having an upwardly facing mouth;
  c) a striking mechanism, operable by rotating about an axis, mounted within and adapted to strike said bell dome;
  d) a cap adapted to fully cover said bell dome mouth, mounted to said bracket, rotatable about said striking mechanism axis, and mechanically coupled to said striking mechanism, whereby rotation of said cap actuates said striking mechanism, and
  e) said mechanical coupling comprising at least one pinion gear, mounted on an axis separate from that of said striking mechanism and said cap, and providing a gear ratio causing said striking mechanism to rotate at a higher speed than said cap, said separate axis mounted to and extending downward from said cap.

2. A warning bell for attachment to bicycle handlebars, comprising:
  a) a bracket adapted to mount to the handlebars;
  b) a bell dome mounted on said bracket having an upwardly facing mouth;
  c) a striking mechanism, operable by rotating, mounted within and adapted to strike said bell dome;
  d) a cap adapted to fully cover said bell dome mouth, mounted to said bracket, operable by rotating and mechanically coupled to said striking mechanism, whereby movement of said cap actuates said striking mechanism, and
  e) said mechanical coupling comprising at least one pinion gear and a fixed main gear engaging said pinion gear, said coupling providing a gear ratio causing said striking mechanism to rotate at a higher speed than said cap.

3. A warning bell for attachment to bicycle handlebars, comprising:
  a) a bracket adapted to mount to the handlebars;
  b) a bell dome mounted on said bracket having an upwardly facing mouth;
  c) a striking mechanism, operable by rotating, mounted within and adapted to strike said bell dome;
  d) a cap adapted to fully cover said bell dome mouth, mounted to said bracket, operable by rotating and mechanically coupled to said striking mechanism, whereby movement of said cap actuates said striking mechanism, and
  e) said mechanical coupling comprising a pinion gear and a second gear, engaged with said pinion gear and engaging said striking mechanism, said coupling providing a gear ratio causing said striking mechanism to rotate at a higher speed than said cap.

4. A warning bell for attachment to bicycle handlebars, or similar, comprising:
  a) a bracket adapted to mount to the handlebars;
  b) a bell dome mounted on said bracket having an upwardly facing mouth;
  c) a striking mechanism, mounted within and adapted to strike said bell dome;
  d) a cap, mounted to said bracket, adapted to cover at least a portion of said bell dome mouth, having a diameter at least somewhat greater than the diameter of said bell dome and comprising a downwardly extending skirt which at least partially encloses said bell dome; and
  e) an actuating mechanism, operatively connected to said striking mechanism, said actuating mechanism mounted to a support extending downward from said cap.

5. A warning bell for attachment to bicycle handlebars, or similar, comprising:

a) a bracket adapted to mount to the handlebars;
b) a bell dome mounted on said bracket having an upwardly facing mouth;
c) a striking mechanism, mounted within and adapted to strike said bell dome;
d) a cap, mounted to said bracket, adapted to cover at least a portion of said bell dome mouth, having a diameter at least somewhat greater than the diameter of said bell dome and comprising a downwardly extending skirt which at least partially encloses said bell dome; and
e) an actuating mechanism, operatively connected to said striking mechanism; and
f) a pinion gear mechanically coupled to said striking mechanism and wherein said actuating mechanism comprises an arcuate segment of gear teeth adapted to engage said pinion gear.

6. The warning bell of claim 5 wherein said striking mechanism operates by rotational movement and wherein said pinion gear provides a gear ratio causing said striking mechanism to rotate at a higher angular rate than said actuating mechanism.

7. The warning bell of claim 6 wherein said mechanical coupling further comprises a second gear, engaged with said pinion gear, and engaging said striking mechanism.

* * * * *